J. E. WYCKOFF.
BEET HARVESTER.
APPLICATION FILED JUNE 17, 1918. RENEWED JULY 28, 1919.

1,322,389.

Patented Nov. 18, 1919.
3 SHEETS—SHEET 1.

Inventor
Joseph E. Wyckoff
by Westall and Wallace
his Attorneys

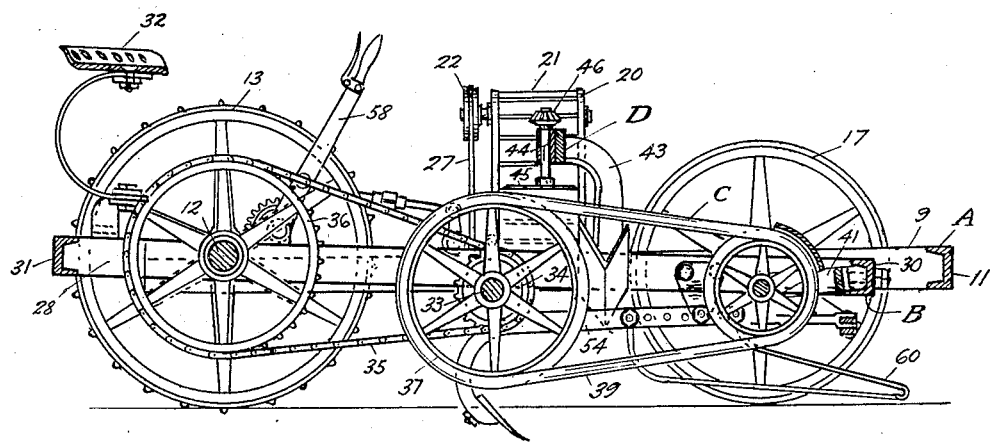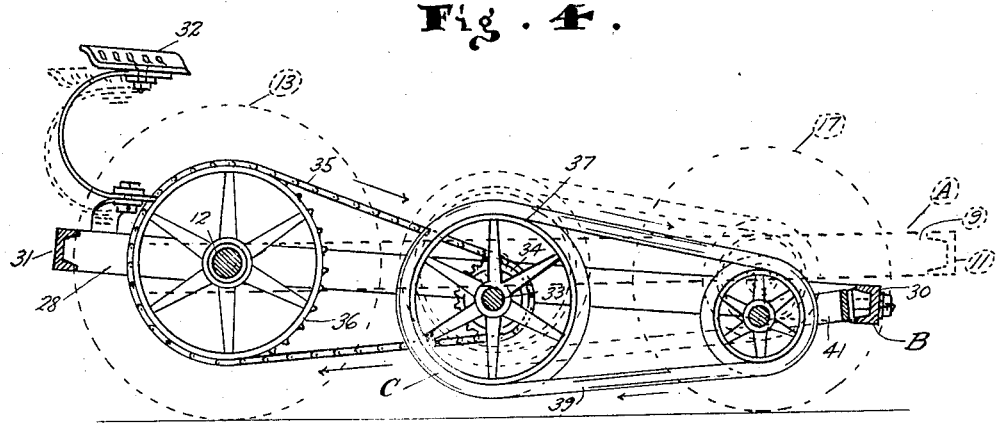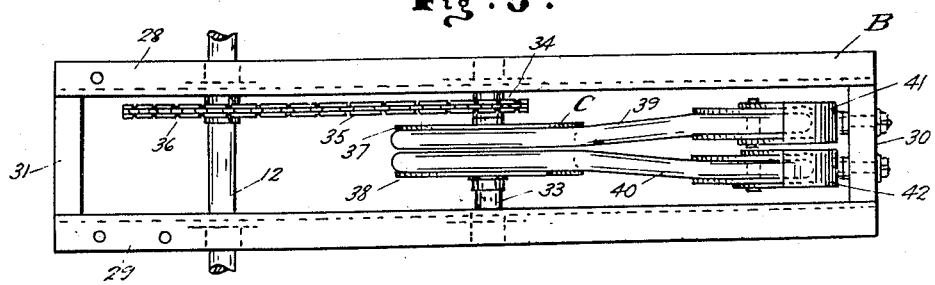

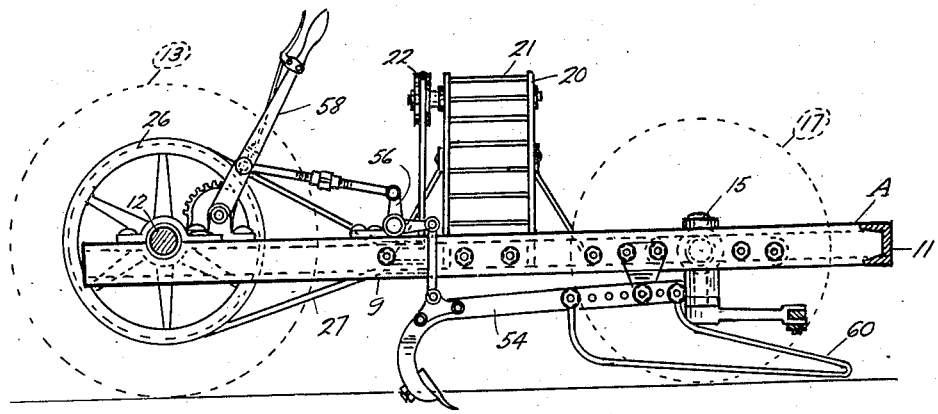
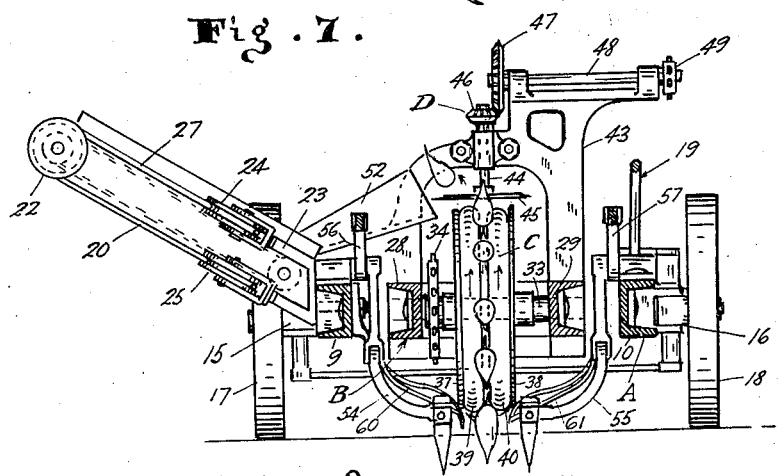

UNITED STATES PATENT OFFICE.

JOSEPH E. WYCKOFF, OF LOS ANGELES, CALIFORNIA.

BEET-HARVESTER.

1,322,389. Specification of Letters Patent. Patented Nov. 18, 1919.

Application filed June 17, 1918, Serial No. 240,331. Renewed July 28, 1919. Serial No. 313,829.

*To all whom it may concern:*

Be it known that I, JOSEPH E. WYCKOFF, a citizen of the United States, residing at Los Angeles, in the county of Los Angeles and State of California, have invented new and useful Improvements in Beet-Harvesters, of which the following is a specification.

This invention relates to a machine for harvesting beets and other plants of a like character, and the main object thereof is to provide a machine which is drawn or propelled parallel to the rows of plants in order to rapidly pull the beets from the ground and deliver them to a selected place. It is another object of this invention to provide a machine which expeditiously pulls the beets from the ground, conveys them to a device for removing the tops, and then releases them.

The primary feature of this invention resides in a continuous grasper, which grips the top of a beet in its position in the ground, pulls the beet from the ground, then maintaining its grip thereon inverts the beet and delivers it to its topping position, whereupon it releases the beet. Another feature of this invention resides in the topping device in combination with the beet grasper, whereby the beet root after being topped is thrown to one side into a chute or like device for delivery.

Figure 1:
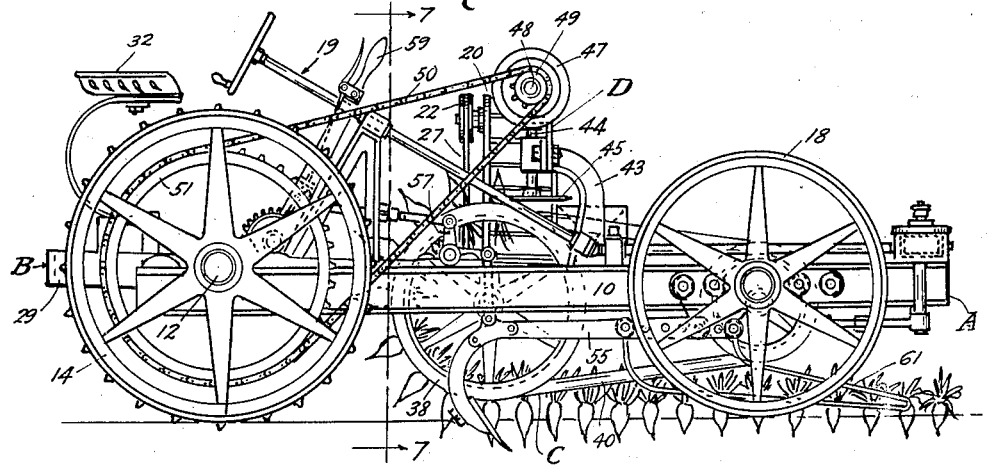
Figure 2:
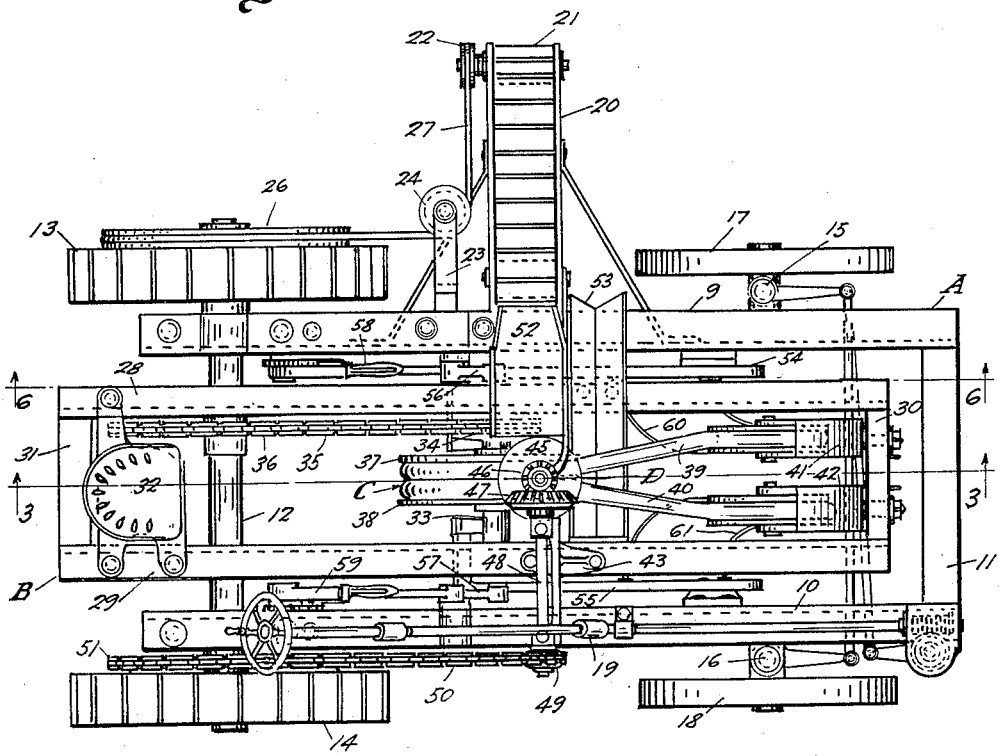

I accomplish these objects by means of the embodiment of my invention illustrated in the accompanying drawing, in which:

Figure 1 is a side elevation of a beet harvester. Fig. 2 is a plan view. Fig. 3 is central section as seen on the line 3—3 of Fig. 2. Fig. 4 is a central section similar to Fig. 3, parts being removed, showing the operation of the harvester mechanism frame. Fig. 5 is a plan view of the harvester mechanism frame, the topper mechanism being removed. Fig. 6 is a section as seen on the line 6—6 of Fig. 2, the ground wheels being indicated by dotted lines. Fig. 7 is a vertical section as seen on the line 7—7 of Fig. 1. Fig. 8 is an enlarged section of the grasper sheaves.

Referring more particularly to the drawings, a chassis is indicated by A. Mounted upon the chassis is a harvester mechanism B, which carries the grasper mechanism C. The topper mechanism is indicated generally by D.

Referring more particularly to the chassis, it includes a frame comprising side bars 9 and 10 joined by a front bar 11. Journaled upon the side bars adjacent the rear end thereof is an axle 12 having fixed to the ends thereof ground wheels 13 and 14. Mounted adjacent the front end of the side bars are steering knuckles 15 and 16, upon the spindles of which are mounted the front ground wheels 17 and 18. The steering of the wheels 17 and 18 is accomplished through steering mechanism of the type usual in automobiles, and indicated generally by 19. As it is not a feature of my invention it will not be further described.

Secured to side bar 9 at about the center thereof is a chute 20, in which operates an endless conveyer belt 21. The conveyer belt is moved by means of a shaft and suitable gearing having a driven pulley 22 secured thereto. Secured to the bar 9 is a bracket 23 having idle pulleys 24 and 25 journaled thereon. Fixed to the ground wheel 13 is a pulley 26. A belt or rope 27 is passed over pulley 26, around idle pulleys 24 and 25 and over driven pulley 22. Upon rotation of the ground wheel 13, the conveyer belt 21 will be moved.

Referring more particularly to frame B, it includes side bars 28 and 29 journaled upon shaft 12. Side bars 28 and 29 are connected at the front by a bar 30 and at the rear by a bar 31. Supported by means of a spring upon the frame adjacent the rear is a seat 32 for the operator of the machine.

Journaled in the side bars of the frame adjacent the center thereof is a shaft 33. Fixed to the shaft 33 is a sprocket 34, which is driven by a chain 35 passing over a sprocket wheel 36 fixed to the shaft 12. Fixed to the shaft 33 is a divided grasper sheave formed of sections 37 and 38. The rims of the sections have their grooves so shaped as to form a single groove tending to throw the grasper belts 39 and 40 into contact with one another as shown in Fig. 8. Swiveled to the bar 30 are shells 41 and 42 carrying idler pulleys over which the graspers 39 and 40 are passed. It will be noted that the grasper belts are separated by means of the pulleys at the front. These belts are preferably hollow resilient tubes. In the travel of the grasper belts from front to rear on the under side, they approach each other coming in contact as they pass over the grasper sheave, and are maintained in contact until they leave the sheave on the upper side.

Supported upon the frame B is a standard 43. Journaled in the standard 43 is a vertical spindle 44, which carries at its lower end a disk knife 45 disposed above the grasper belt and to the rear of the point where they separate. Fixed to the upper end of the spindle is a bevel pinion 46 which meshes with a bevel gear 47. Bevel gear 47 is secured to a shaft 48 journaled on bracket 43, and fixed to one end of the shaft is a sprocket 49. Passing over sprocket 49 is chain 50, which is driven from a sprocket wheel 51 secured to ground wheel 14. Rotation of ground wheel 14 causes the disk knife to revolve. Secured to the frame C to one side of the grasper and in line with the disk knife is a trough 52, which catches the beet roots thrown by the knife and directs them into the conveyer 20.

The machine is so directed that the row of beets is in line with dividing plane between the grasper belts. The top of the beets are first gripped between the grasper belts, then as they approach the grasper sheave the latter further grasps the tops by pinching the tops thereagainst so that the beets are firmly held by the tops between the grasper belts and the sheave. The beets are then pulled from the ground, then carried upwardly being inverted, and presented to the topping knife 45, which cuts the beet roots from the top. The centrifugal force of the disk knife throws the beet roots in the trough 52. The beet tops are carried forward, the grasper separating and dropping the tops into a chute 53, passing therethrough by gravity to the ground or any suitable receptacle. The frame being pivoted the sheave rides on the ground pressing upon the beets. The grasper belts also ride over the ground, so that the belts are in position to grasp the beet tops. The weight of the operator on seat 32 counterbalances the weight of the forward end of the frame.

In order to loosen the beets in the soil, plow or soil disturbing devices may be attached to the frame. Such devices are now commonly used for this purpose to loosen beets for manual harvesting. Pivotally secured to the side bars 9 and 10 by means of brackets are plow beams 54 and 55 carrying plow shares. The free ends of the plow beams are connected by links to bell cranks 56 and 57 secured to hand levers 58 and 59 having ratchet levers thereon, and disposed convenient to the position of the operator. By means of the hand levers the plows may be raised and lowered. Secured to plow beam 54 is a fender 60 and secured to beam 55 is a coöperating fender 61. These fenders are so arranged that they precede the graspers straightening up the beet tops and arranging them to be gripped by the grasper. Any other suitable and convenient type of beet root loosener and fender may be used. These elements form no part of my invention.

The harvester may be drawn by horses, tractors or any suitable power. If desired, the harvester may be made self propelled. It is of course understood that the harvester may be mechanically varied in its construction to adapt it to the motive power used.

Throughout the claims I have used the word belts in the broad sense of an endless flexible member for conveying power, thus including chains and the like.

What I claim is:

1. In a plant harvester, a grasper comprising a sheave arranged to ride on the ground, a pair of endless grasper belts passed over said sheave and disposed in the groove thereof so as to be in contact with one another, and means over which said belts are passed to separate them, whereby the belts approach each other toward one bight and recede from each other toward the other bight.

2. In a plant harvester, a sheave arranged to ride on the ground, a pair of endless grasper belts passed over said sheave and disposed in the grooves thereof so as to be in contact with one another, and spaced pulleys over which said belts pass to separate them on both sides, whereby the belts approach each other toward one bight and recede from each other toward the other bight.

3. In a plant harvester, a grasper comprising a sheave, a pair of opposed endless grasper belts passed over said sheave and disposed in the groove thereof so as to be in contact with one another, means over which said belts are passed to separate them, whereby the latter approach each other at one bight and recede from each other at the other bight, and means to cut the plant tops from the roots disposed over the top of the belts at the bights where the belts recede in their travel.

4. In a plant harvester, a sheave arranged to ride on the ground, a pair of endless grasper belts passed over said sheave and disposed in the groove thereof so as to be in contact with one another, means over which said belts are passed to separate them, whereby the belts approach each other toward one bight and recede from each other toward the other bight, and means to cut the plant tops from the roots disposed adjacent the top of the belts at the sheave.

5. In a plant harvester, a sheave arranged to ride on the ground, a pair of endless grasper belts passed over said sheave and disposed in the grooves thereof so as to be in contact with one another, spaced pulleys over which said belts pass to separate them on both sides, whereby the belts approach each other toward one bight and recede from each other toward the other bight, and means to cut the plant tops from the roots disposed adjacent to the top of the belts at the sheave.

6. In a plant harvester, a grasper comprising a sheave having a concave groove, a pair of endless resilient grasper belts passed over said sheave and disposed in said groove so as to be in contact with each other, and means over which said belts are passed to separate them, whereby the belts approach each other toward one bight and recede from each other toward the other bight, said belts being circular in transverse section and having uninterrupted exterior surfaces.

7. In a plan harvester, a grasper comprising a pair of opposed endless resilient grasper belts approaching each other at one bight and receding from each other at the other bight, said belts being circular in transverse section and having uninterrupted exterior surfaces, and means to cut the plant tops from the roots disposed over the tops of the belts at the bight where the belts recede in their travel.

8. In a plan harvester, a sheave having a concave groove, a pair of endless resilient grasper belts passed over said sheave and disposed in said groove so as to be in contact with each other, means over which said belts are passed to separate them, whereby the belts approach each other toward one bight and recede from each other toward the other bight, said belts being circular in transverse section and having uninterrupted exterior surfaces, and means to cut the plant tops from the roots disposed adjacent the tops of the belts at the sheaves.

9. In a plant harvester, a sheave having a concave groove, a pair of endless resilient grasper belts passed over said sheave and disposed in said groove in contact with one another, spaced pulleys over which said belts pass to separate them on both sides, whereby the belts approach each other toward one bight and recede from each other toward the other bight, said belts being circular in transverse section and having uninterrupted exterior surfaces, and means to cut the plant tops from the roots disposed adjacent to the tops of the belts at the sheave.

In witness that I claim the foregoing I have hereunto subscribed my name this 11th day of June, 1918.

JOSEPH E. WYCKOFF.